UNITED STATES PATENT OFFICE.

CHARLES M. HIGGINS, OF BROOKLYN, NEW YORK.

MUCILAGE.

SPECIFICATION forming part of Letters Patent No. 466,240, dated December 29, 1891.

Application filed May 20, 1891. Serial No. 393,459. (No specimens.)

*To all whom it may concern:*

Be it known that I, CHARLES M. HIGGINS, a citizen of the United States, residing in Brooklyn, in the county of Kings and State of New York, have invented certain new and useful Improvements in Mucilages or Adhesive Compounds, of which the following is a specification.

My improved adhesive compound is formed of water, borax, dextrine, and peroxide of hydrogen, and to the mucilage thus formed I sometimes add aqua-ammonia or other alkali, as hereinafter set forth.

In forming this compound I first preferably heat the water to boiling, or nearly so, and then add the borax, and when the same is dissolved the dextrine is stirred in and the heat continued until the solution is fully effected. The borax may be added after the dextrine; but I prefer the order named. The proportions of these ingredients may vary considerably, according to the density of the mucilage required; but it is important that the borax used be a very large fraction of the weight of the dextrine. For example, the borax should be from one-sixteenth to one-fourth of the weight of the dextrine. One-fourth is about the saturating limit, while one-sixteenth is about as low a fraction as will produce practicable results. The proportions I have found best are equal parts of water and dextrine and borax one-eighth of the dextrine, these parts being by weight. When the solution of the three ingredients of water, borax, and dextrine is effected as described, it is allowed to cool to, say, 60° and 100° Fahrenheit, and a large volumetric fraction of peroxide of hydrogen, preferably one-sixteenth to one-eighth of the volume of the mucilage, is then added gradually and stirred in gently until thoroughly mixed with the mucilage. The peroxide used is preferably the commercial of full strength, known as "fifteen volumes." The mixture is then allowed to rest for some time to clear and settle, and after a few days or weeks the clear supernatant liquid forming the perfected mucilage may be drawn off and bottled.

In this compound the borax seems to combine chemically with the dextrine, for a very large fraction will remain in solution with the dextrine without crystallizing—viz., an amount of borax equal to one-eighth to one-fifth of the dextrine—and it acts to produce a much more perfect solution of the dextrine in the water, which will not afterward separate or precipitate in a flocculent or sedimentary form, as is the case with most all the usual solutions of dextrine and water. The peroxide in the presence of borax also acts in an energetic chemical manner on the dextrine in solution, and its effect is not only to render the solution very light-colored, but it also acts to perfectly clarify it, separating and precipitating a light flocculent matter, which soon settles and renders the mucilage very clear and transparent and of a brilliant light-amber color, whereas all other dextrine solutions are murky and dirty in appearance and retain only a part of the dextrine in permanent solution. The amount of light flocculent matter thrown down by the action of the peroxide and borax, as above described, is but a very small fraction of the entire bulk of the dextrine, perhaps not more than one-twentieth, all the rest of the dextrine being retained in a perfectly transparent and dense solution, whereas ordinary dextrine solutions remain dark and murky and deposit a very large portion in a dense grayish sediment, which in my compound is held in perfect solution.

In the formula which I have specified it seems that a boron compound or an equivalent thereof, in connection with the peroxide of hydrogen, is essential to produce the lightening and clarifying effect noted, for this effect cannot be obtained if carbonate or bicarbonate of soda or any of the caustic alkalies are used in place of the biborate of soda; but it can be produced when boracic acid is used in place of the borax. It is probable, therefore, that some other mild salt analogous to borax or an acid analogous to the boracic will serve as an equivalent to the borax in addition to the boracic acid. It also seems to be essential to effect the full chemical combination of the dextrine and borax or its equivalent that heat be employed in making the solution, and usually a temperature of 90° Fahrenheit, or thereabout. The preferable range of temperature is between 150° and the boiling-point, which will produce the best combination and solution, whereas a temperature materially below 90° will not produce a perfect combination. After the mucilage has become clear and settled, as described, I sometimes add thereto a small portion of aqua-ammonia or other alkali—say, preferably, from one-sixteenth to one-fortieth of its volume of ammonia of 20° Baumé or of soda-lye of 40° by the same scale. This has the effect of greatly increasing the body or viscosity of the mucilage and improving its adhesiveness, and also prevents all mold or decay.

Other thickening or coagulating agents may be used besides the caustic alkalies. The alkaline salts and alum may be so used. The alkaline salts, however—such, for instance, as carbonate of soda—have but a slight thickening effect. Alum, however, when used with the alkalies, increases the thickening effect very decidedly. A saturated aqueous solution of alum may be used for this purpose, preferably in a volume equal to the volume of the alkali; but this proportion may vary. The alum solution is preferably added first to the mucilage and intimately stirred, and the alkaline solution is then stirred in, when a strong thickening effect takes place, the mucilage becoming extremely viscous and adhesive. The alkaline solution may, however, be added before the alum solution; but the effect is not so good. Sometimes a second portion of the peroxide may be added after the mucilage has become clear by the action of the first lot, which will have the effect to render the mucilage still clearer and purer.

The general advantages claimed for this invention are that it enables a mucilage of superior character, both in appearance and qualities, to be produced from dextrine as the sole adhesive basis, the product being equal, if not superior, in all respects to that produced with natural gums, at much less cost. It entirely overcomes the objections found heretofore in utilizing dextrine for this purpose—viz., the dark murky appearance of the solution after separation in the solution and the quick decay in the same.

The improved mucilage is quite viscous, very quick in adhering, and quick to dry, not affected by atmospheric changes in moisture or temperature, non-corrosive and bright and clean in appearance, transparent and wholly free from sediment, and thus presents an important improvement in the art.

The mucilage herein described may of course be dried into a granular gum, which can be dissolved in water, as required. When thus dissolved, a little ammonia can be added to the solution with the effect already described.

Either white or yellow dextrines may be used in this compound, preferably the pale-yellow dextrines. Glucose or grape-sugar will combine and act almost precisely in the same manner as the dextrine, and hence might be considered as an equivalent and substitute for the dextrine; but the sugars will not produce a good mucilage, whereas the dextrine will.

A mucilage made according to the method herein described, with one of the sugars substituted for the dextrine, would be inferior in adhesive power and would be quite hygroscopic, whereas the described composition made with dextrine is a very quick drier and not at all susceptible to atmospheric moisture.

What I claim as my invention is—

1. An adhesive compound composed of water, dextrine, a boron compound, and peroxide of hydrogen, substantially as described.

2. An adhesive compound formed of water, a boron compound, dextrine, peroxide of hydrogen, and an alkali or thickening agent, substantially as herein set forth.

3. An adhesive compound formed of water, borax, dextrine, peroxide of hydrogen, and an alkali, substantially as herein set forth.

CHAS. M. HIGGINS.

Witnesses:
JNO. E. GAVIN,
P. FRANCIS KELLY.